United States Patent
Koch et al.

(10) Patent No.: US 11,430,016 B2
(45) Date of Patent: Aug. 30, 2022

(54) MANAGING INTERACTIONS OF PRODUCTS AND MOBILE DEVICES

(71) Applicant: AT&T Intellectual Property I, L.P., Atlanta, GA (US)

(72) Inventors: Robert Koch, Peachtree Corners, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 133 days.

(21) Appl. No.: 16/710,508

(22) Filed: Dec. 11, 2019

(65) Prior Publication Data
US 2021/0182914 A1 Jun. 17, 2021

(51) Int. Cl.
G06Q 30/02 (2012.01)
G06Q 30/06 (2012.01)
H04W 4/021 (2018.01)
G06Q 10/08 (2012.01)
G08B 13/24 (2006.01)

(52) U.S. Cl.
CPC ... *G06Q 30/0271* (2013.01); *G06Q 10/08355* (2013.01); *G06Q 30/0261* (2013.01); *G06Q 30/0631* (2013.01); *G06Q 30/0643* (2013.01); *G08B 13/246* (2013.01); *H04W 4/021* (2013.01)

(58) Field of Classification Search
None
See application file for complete search history.

(56) References Cited

U.S. PATENT DOCUMENTS

| | | |
|---|---|---|
| 8,108,265 B2 | 1/2012 | Bonner et al. |
| 8,442,550 B2 | 5/2013 | Blumberg et al. |
| 8,515,824 B2 | 8/2013 | Herring et al. |
| 8,543,468 B2 | 9/2013 | Carlson |
| 8,611,919 B2 | 12/2013 | Barnes, Jr. |
| 9,317,996 B2 | 4/2016 | Pierce et al. |
| 9,892,445 B2 | 2/2018 | Maass |
| 2004/0138986 A1 | 7/2004 | Petrovich |

(Continued)

FOREIGN PATENT DOCUMENTS

| | | |
|---|---|---|
| WO | WO 2013/028162 A1 | 2/2013 |
| WO | WO 2013/119969 A1 | 8/2013 |

OTHER PUBLICATIONS

M. Radhakrishnan, S. Sen, Vigneshwaran S., A. Misra and R. Balan, "IoT+Small Data: Transforming in-store shopping analytics & services," 2016 8th International Conference on Communication Systems and Networks (COMSNETS), 2016, pp. 1-6, doi: 10.1109/COMSNETS.2016.7439946. (Year: 2016).*

(Continued)

*Primary Examiner* — Sam Refai
*Assistant Examiner* — Rashida R Shorter
(74) *Attorney, Agent, or Firm* — Guntin & Gust, PLC; Robert Gingher (57) ABSTRACT

Sensors may detect a user's locations and interest level of a product. Based on the interest level, messages may be sent to a server in order to obtain information, such as location, about a category of products and further display the obtained information to a mobile device.

20 Claims, 4 Drawing Sheets

(56) References Cited

U.S. PATENT DOCUMENTS

| | | | |
|---|---|---|---|
| 2005/0055281 A1* | 3/2005 | Williams | G06Q 10/00 |
| | | | 235/383 |
| 2005/0149391 A1* | 7/2005 | O'Shea | G06Q 30/0238 |
| | | | 705/14.38 |
| 2007/0078722 A1 | 4/2007 | Saxena et al. | |
| 2008/0262958 A1 | 10/2008 | Ku et al. | |
| 2009/0112733 A1 | 4/2009 | Horowitz | |
| 2012/0022965 A1 | 1/2012 | Seergy | |
| 2012/0158508 A1 | 6/2012 | Kilroy et al. | |
| 2012/0179561 A1 | 7/2012 | Sun et al. | |
| 2012/0330745 A1 | 12/2012 | Bennett et al. | |
| 2013/0185161 A1 | 7/2013 | Letca et al. | |
| 2014/0236753 A1 | 8/2014 | Abhyanker | |
| 2014/0280339 A1* | 9/2014 | Jain | G06F 16/951 |
| | | | 707/775 |
| 2016/0012520 A1 | 1/2016 | Aquino | |
| 2016/0210602 A1* | 7/2016 | Siddique | G06Q 20/204 |
| 2017/0011423 A1* | 1/2017 | Douglas | H04W 4/029 |
| 2018/0053241 A1* | 2/2018 | Haver | G06Q 30/0207 |
| 2018/0174199 A1* | 6/2018 | Stern | G06Q 30/0269 |
| 2019/0043122 A1 | 2/2019 | Chin et al. | |
| 2019/0139097 A1 | 5/2019 | Michaelson et al. | |
| 2019/0172088 A1* | 6/2019 | Mohiuddin | G06Q 30/0226 |
| 2019/0205933 A1 | 7/2019 | Glaser et al. | |
| 2020/0074506 A1* | 3/2020 | Garcia Galvao Almeida | G01S 5/14 |

OTHER PUBLICATIONS

"Boost your mobile apps"; http://www.beaconstac.com/; mobstac; 2014; 4 pages.

"Coursa retail"; http://www.coursaretail.com/; InvenSense, Inc.; 2016; 10 pages.

"Mark up the world using beacons"; http://developers.google.com/beacons/; Google; 2015; 3 pages.

\* cited by examiner

MANAGING INTERACTIONS OF PRODUCTS AND MOBILE DEVICES

BACKGROUND

In a world of ever increasing smart devices and smarter technologies, the internet of things (IoT) proposes that everyday objects and devices (e.g., light bulbs, washing machines, and cameras) are to have an internet connection, where these objects are enabled to send or receive data to and from other devices, thus forming a larger network of connected things (e.g., objects or devices). The IoT promises smarter homes and work environments where all the objects are seamlessly connected and controlled for easier and more convenient operation. This disclosure is directed to addressing issues in the existing technology.

This background information is provided to reveal information believed by the applicant to be of possible relevance. No admission is necessarily intended, nor should be construed, that any of the preceding information constitutes prior art.

SUMMARY

Disclosed herein are methods, systems, and apparatuses that provide for managing interactions of products and mobile devices. In an example, an apparatus may include a processor and a memory coupled with the processor that effectuates operations. The operations may include detecting a mobile device associated with a user that enters a physical environment, wherein the physical environment comprises a plurality of products of different categories, wherein the plurality of products of different categories comprise a first product of a first category and a first type and a second product of the first category but of a second type; responsive to detecting the mobile device, determining an interest level of a user with the first product of the plurality of products based on information from a sensor in the physical environment; based on interest level reaching a threshold level, obtaining information about the first product, the second product, or a profile associated with the user; and based on the obtained information about the first product, the second product, or the profile, managing interactions associated with the first product.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

This disclosure describes the management of interactions of products and mobile devices. Sensors may detect a user's locations and interest level of a product. Based on the interest level, messages may be sent to a server in order to obtain information, such as location, about a category of products and further display the obtained information to a mobile device.

Figure 1:
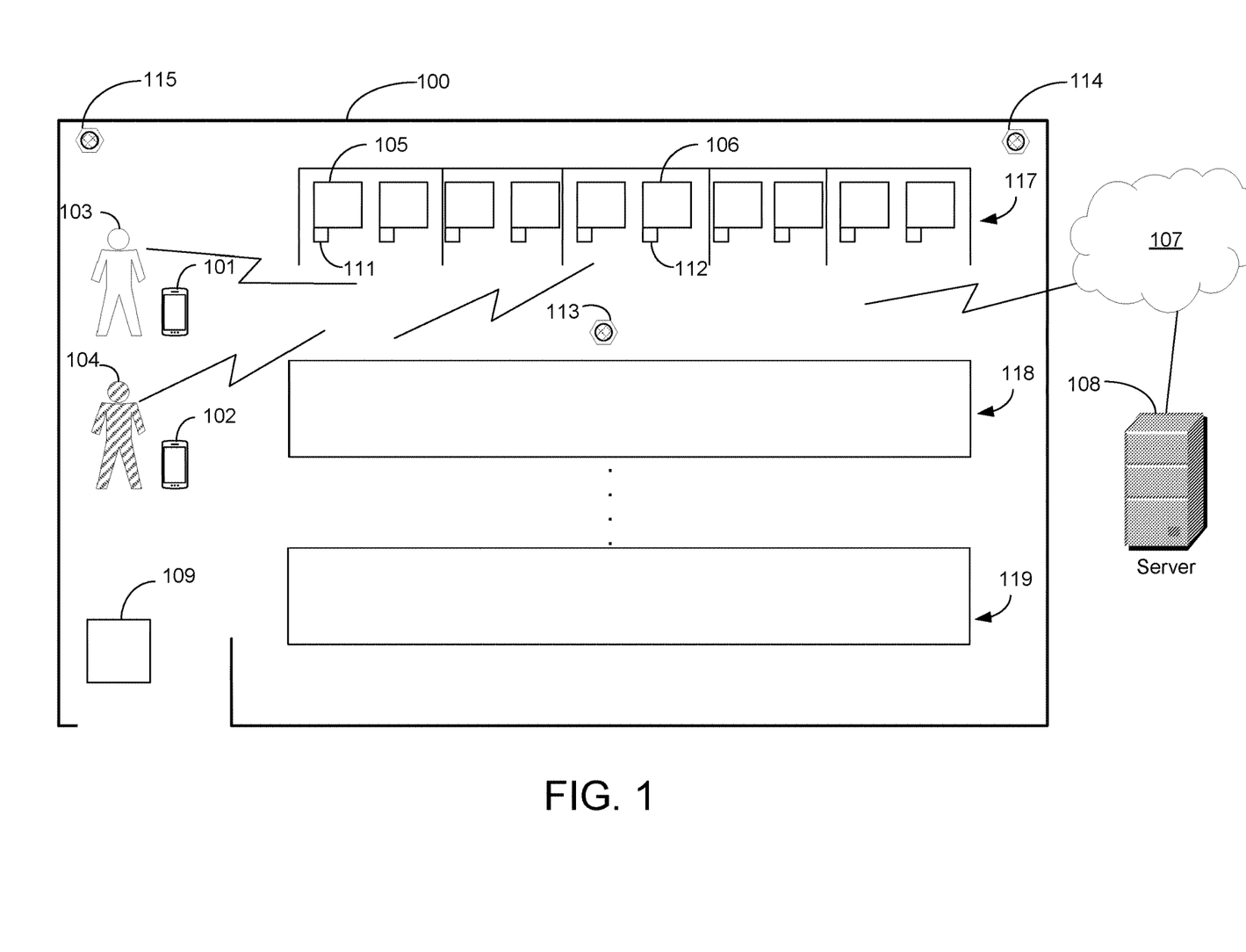
FIG. 1 illustrates an exemplary system associated with managing interactions of products and mobile devices.

FIG. 1 illustrates an exemplary system associated with managing interactions of products and mobile devices. Physical environment 100 may be a shopping environment, such as a grocery store, farmer's market, mall, or another retail environment. Physical environment 100 may include aisle 117—aisle 119 which may include different categories of products and point of sale (POS) device 109. Physical environment 100 may include a plurality of devices, users, products, and aisles, among other things. As shown, there are a plurality of devices, such as sensor mobile device 101 associated with user 103, mobile device 102 associated with user 104, product 105 associated with electronic tag 111, product 106 associated with electronic tag 112, product management device (PMD) 108, or sensor 113—sensor 115, which may be communicatively connected with each other using wireless, wireline, or network 107. Electronic tag 111 may be affixed to product 105 (e.g., product package or physical product component) and communicate via wireless communication to mobile device 101, PMD 108, or other electronic tags (e.g., electronic tag 112 associated with product 106), among other things.

PMD 108 (e.g., a server) may manage detection, assessment, and alerts associated with physical environment 100. Mobile device 102 may be a smart watch and mobile device 101 may be a smartphone. It is contemplated that mobile device 101 or mobile device 102 may include wireless devices, such as portable digital assistants (PDAs), laptop computers, tablet devices, smart phones, smart watches, smart glasses, autonomous or unmanned vehicles, augmented reality devices, virtual reality devices, or the like. The sensors (e.g., sensor 113) may include an environmental sensor, acoustic sensor, sound sensor, vibration sensor, fluid sensor, optical sensor, position sensor (e.g., accelerometer or gyroscope), speed sensor, chemical sensor, pressure sensor, camera, or the like. Sensor 113 may be substantially integrated into an object (e.g., product 105 associated with electronic tag 111) or may be a stand-alone device.

Figure 2:
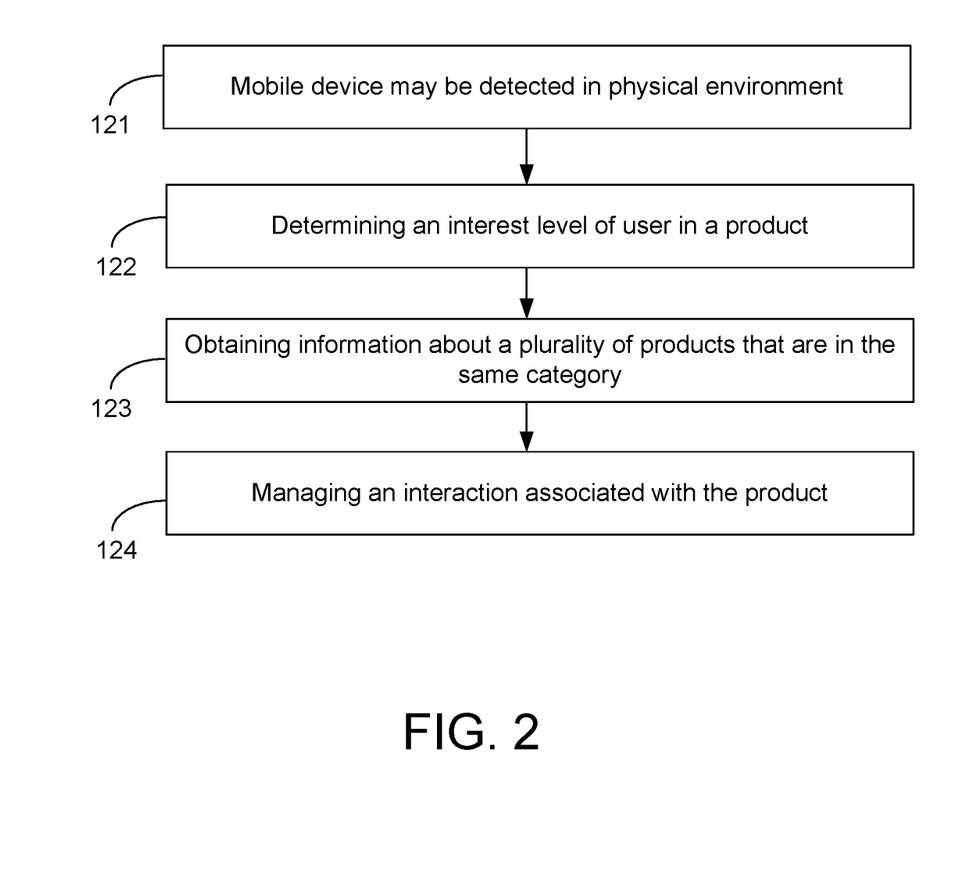
FIG. 2 illustrates an exemplary method associated with managing interactions of products and mobile devices.

FIG. 2 illustrates an exemplary method associated with managing interactions of products and mobile devices. At step 121, mobile device 101 may be detected in physical environment 100 by a sensor. User 103 may have mobile device 101, such as a smartphone, smartwatch, or token or other holdable, wearable, or implantable mobile device. User 103 may also have an interface to mobile device 101 using a virtual assistant that communicates with user 103 via a speech, touch display, or other interfaces It is contemplated that based on the profile of the device/user or the category of product the sensors may not be activated or different sensors may be activated. The sensors may have been in sleep mode or the like and then awakened based on the proximity of mobile device 101. In addition, sensors within mobile device 101 that are not in use may be activated, such as a camera, accelerometer, gyroscope, magnetometer, GPS, proximity sensor, pedometer, thermometer, air humidity sensor, or microphone (e.g., for virtual assistant), among other things. For detection, a beacon, which may be a Bluetooth beacon, may be used to detect the presence of mobile device 101 and may send the location to PMD 108.

At step 122, responsive to detecting mobile device 101 in proximity to physical environment 100 or other factors, determining, based on information from a sensor (e.g., electronic tag 111, mobile device 101, or sensor 113), an interest level of user 103 in product 105. For example, factors may be based on the proximity of mobile device 101 to electronic tag 111 (e.g., less than 4 feet) and indication of movement by a sensor (e.g., accelerometer or gyroscope) of electronic tag 111. An accelerometer or gyroscope may indicate that product 105 (and electronic tag 111) has been picked up or whether product 105 has been turned around for user 103 to review features of product 105, for example. Other example factors may include scanning or other communication with electronic tag 111 (or UPC or QR code tag) by mobile device 101, a virtual button (e.g., display interface of mobile device 101) or physical button pressed associated with electronic tag 111 by user 103, audio communication (e.g., speech communication) associated with mobile device 101, or otherwise communicate with electronic tag 111, which is indicative of an interest level. The interest level may be a value that may be incremented in a weighted fashion based on the one or more factors. It is contemplated that a physical electronic tag may not be required.

With continued reference to FIG. 2, at step 123, based on the interest level of step 122 reaching a threshold interest level, obtaining information about a plurality of products that are in the same category, which includes product 105 and one or more other products, and a profile of user 103. The interest level may be indicated by an alpha or numerical value. For example, 'A' or 90 may be a high level of interest, while 'F' or 10 may be a low level of interest. If a threshold of interest is 'C' or 70, then the threshold interest would be reached for any letter A, B, or C, or any numerical value 70 or above, in these examples. It also contemplated that more information about the plurality of products may be shared, based on the interest level. In a first example, for a C level of interest a comparison of product 105 and product 106 (which are the same category (e.g., power drills)) may be shown, which may include information about sale prices and features. In a second example, for an A level of interest, the aforementioned comparison information in addition to friends or influencers (e.g., the favorite athlete of user 103) that have purchased the same or similar product may be shown.

With continued reference to step 123, the information obtained about the plurality of products may include social media information about owners or endorses that are tailored to user 103 (e.g., based on profile information), prices, features, product photo, manufacturer name, compatibility to a product already owned or previously purchased by user 103, compatibility of components already owned or purchased by user 103, compatibility to products already planned to be purchased by user 103 (e.g., detected in user virtual or physical shopping basket), social media connections that have discussed the products, or reviews of the products, among other things. The profile of user 103 may include social media information, shopping history in physical environment 100 or similar physical environments (e.g., same or similar brand store), user identifier, indicated favorites of user 103, user city, user state, user age, user hobbies, age, gender, marital status, occupation, college, dimensions of user 103 (e.g., user height or width), or dimensions of a home of user 103, among other things.

At step 124, based on the obtained information of step 123, managing an interaction associated with product 105. The managing may include sending alerts for display on mobile device 101 or other devices, manipulating devices associated with physical environment 100 (e.g., speech audio, music audio, or electronic tag 111), or sending instructions to indicate devices (or users) should proceed to a particular area (e.g., aisle 117 with product 105), among other things.

With continued reference to step 124, in an example, the managing of the one or more interactions may be to send an alert to mobile device 101 for display. The displayed alert may include text or graphics associated with the obtained information of step 123. Table 1 shows exemplary obtained information that may be displayed on mobile device 101. Further, based on the obtained information, each product may be provided a rank that is displayed on mobile device 101. In addition, the position of product 105 or product 106 in physical environment 100 may also be displayed.

TABLE 1

| | Product 105 (Drill 1) | Product 106 (Drill 2) |
|---|---|---|
| Price | $70 | $65 |
| Features | 20 V, 5 hours of runtime | 18 V, 7 hours of runtime |
| Compatibility | None | Compatible w/batteries you Own |
| Social Media Connections | Owen purchased 2 years ago and still owns | John purchased 2 months ago and sold 2 days ago |

In another example, the managing of the one or more interactions may include PMD 108 or electronic tag 111 sending instructions that a customer service representative should move to aisle 117 that includes product 105 and product 106. The customer service representative (e.g., user 104 with mobile device 102) may see information similar to the obtained information which may be shown on mobile device 101 of user 103. PMD 108 may send instructions to mobile device 101 to play audio, display text/graphics, or vibrate to indicate that mobile device 101 has been sent an offer or comparison information (e.g., Table 1). The management of interactions may be used for scenarios such as directing users to alternative products (e.g., product 106) within physical environment 100 or a virtual (e.g., online) store associated with physical environment 100. In another example, the managing of the one or more interactions may include PMD 108 or electronic tag 111 sending instructions to an unmanned vehicle to move to the location of user 103. The unmanned vehicle may bring similar products, such as product 106 to the location user 103.

In another example, management of interactions may include obtaining an indication of an acceptance of an offer for one or more of the plurality of products (e.g., product 105), which may have been displayed on mobile device 101, and then sending a message to an electronic tag (e.g., electronic 111) that indicates acceptance of such offer for checkout for the user. For instance, if an offer of $70 is accepted for product 105, then the price may be communicated just to electronic tag 111 of product 105 (and no other electronic tags). This may allow for personalized offers when shopping. Alternatively, or in addition to, POS 109 or PMD 108 may keep a record of the offer for a limited time (e.g., in an electronic shopping cart) and then confirm the accepted offer(s) upon checkout of physical environment 100. Checkout may be considered the scanning of the particular electronic tag (e.g., electronic tag 111), scanning (or other communication) of mobile device 101 associated with user 103, or the like.

It is contemplated herein that the movement of users may be directed by using something other than a mobile device. For example, a camera viewing physical environment 100 may detect user 103 and a remote display (e.g., computer monitor) may indicate to the user the location of product 106. It is also contemplated that steps herein may be based on user detection or device detection. The steps disclosed herein may be implemented over one or more devices (e.g., mobile device 101, PMD 108, electronic tag 111, or POS 109).

Disclosed in more detail below are additional aspects and further considerations associated with managing interactions of products and mobile devices. In an exemplary scenario, PMD 108 may determine user 103's interest in power drills. This may be done in a number of ways, including accessing user profile information, detecting a shopping list on mobile device 101, by detecting the location of user 103 relevant to that product on store shelves, or by detecting the physical interaction of user 103 with product 105. This may be accomplished, for example, by detecting that user 103 has picked up the product by detecting motion via an accelerometer embedded in electronic tag 111 attached to product 105 (e.g., product packaging). Electronic tag 111 may communicate via a LAN or PAN such as WiFi or Bluetooth. PMD 108, electronic tag 111, (or another device) may broadcast to other nearby products (e.g., product 106) on the physical shelves of physical environment 100 that user 103 is interested in power drills and that user 103 has specifically interacted with product 105 (e.g., Brand 1 drill). For instance, this may be communicated to product 106 (e.g., Brand 2 drill), which is located nearby. The alternate product (e.g., product 106) may have electronic tag 112 that received this information. Electronic tag 112 may also store data about product 106 that it is attached to and electronic tag 112 may also communicate via PMD 108. Product 106 may be equipped with data and network connections to initiate its own bidding for the attention of user 103 to attempt to win user 103.

Product 106 (the alternate product) may send a request to PMD 108 to initiate a bid for user 105. PMD 108 may use information received from product 106 and also data from additional sources to construct a bid for user 105. For instance, PMD 108 may access profile information or product manufacturer data. Profile information may include information about social media connections who may own the product and allow the user to connect with them. The text that is sent may optionally go to a virtual assistant that has access to usage records of product 106 or product 105. In this case, John's virtual assistant might respond on behalf of John saying, "John has used this product 20 hours over the past month—no maintenance issues reported."

PMD 108 may send an offer (e.g., bid) to mobile device 101, which may be displayed, showing a comparison of the two product offers, including a reduced-price offer from product 106. The offer may exist for a specified period of time. The offer may also include information obtained by social influencers. For instance, when a social influencer purchases a product, part of the electronic purchase transaction may include an automated posting of the purchase on social media. This may be a tag of the Product ID number with a hashtag, e.g., #BDCDMT120C, which results in a social media posting such as "Celebrity just bought product 105" and this is stored in a social influencer product database, to be used later to create the offer. An alternative may include allowing user 105 make a counter-offer. In this case, the PMD 108 may be pre-populated with minimum offer information. The price offer made may vary based on the purchasing power of user 105, as determined by PMD 108. For instance, a credit score, a reputation score, a social influencer score, or other data may be included that represents the purchasing power of user 105. In this manner, the price amount of the offer may vary from user to user. User 105 may have a virtual assistant app on mobile device 101 that communicates with PMD 108 and makes offer acceptance decisions on behalf of the user. The offer may include an augment or virtual reality video pitch or demo that is presented to user 105. This offer may be created in real-time by PMD 108 and customized to the specific user based on profile information of user 105.

Conventionally, consumers are overwhelmed with buying choices, reviews, and product information. The disclosed subject matter may provide a system for providing a shopper with assistance in making an effective purchase. Further, the disclosed subject matter may give more control to consumers by allowing the consumer to participate in a bidding process. A first product itself may initiate a bid to capture the consumer when the consumer may be interacting with a second product of the same type as the first product (e.g., power drills by two different brands).

Figure 3:
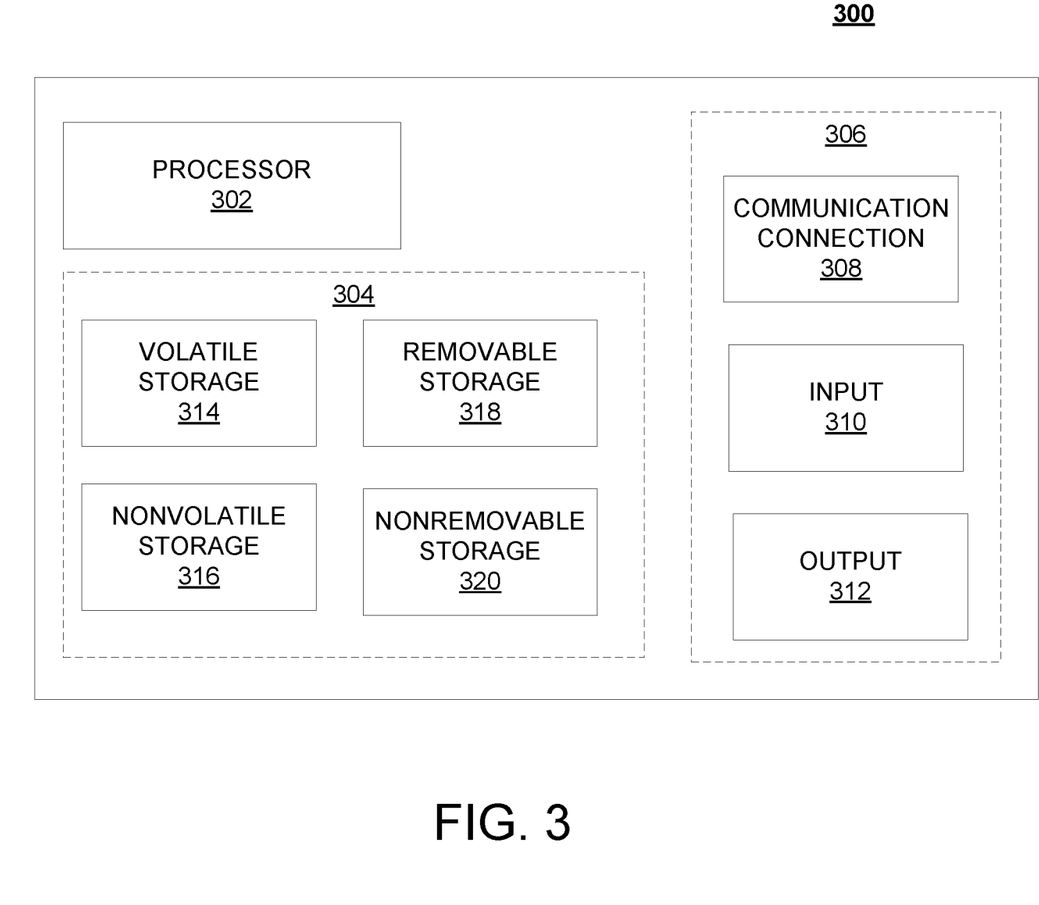
FIG. 3 illustrates a schematic of an exemplary network device.

FIG. 3 is a block diagram of network device 300 that may be connected to or comprise a component of physical environment 100 or FIG. 1. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
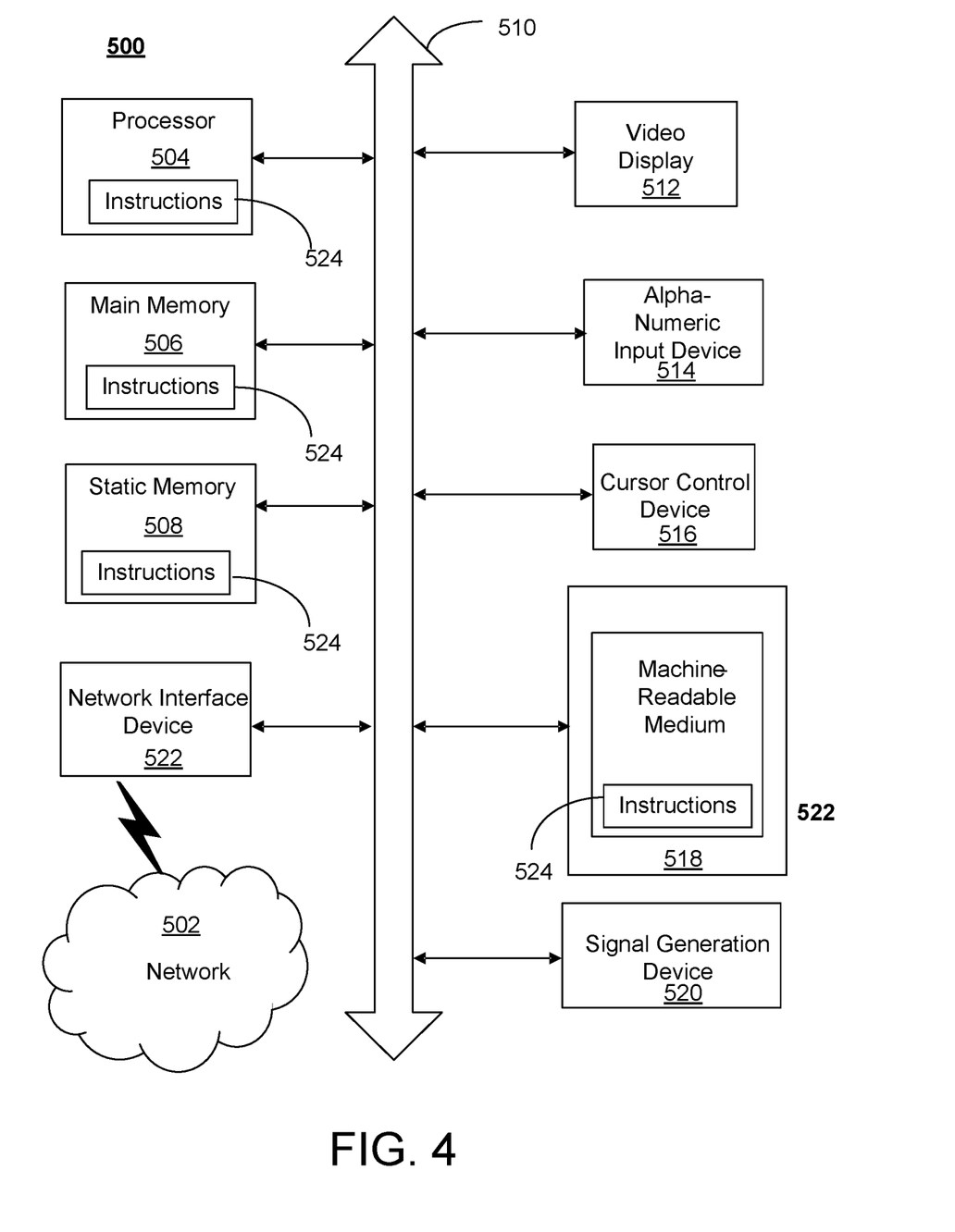
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, mobile device 102, electronic tag 111, electronic tag 112, or PMD 108 and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which messages associated with managing interactions of products and mobile devices can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—managing interactions of products and mobile devices—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing interactions between a product and mobile device. A method, system, computer readable storage medium, or apparatus may provide for detecting a mobile device associated with a user that enters a physical environment, wherein the physical environment comprises a plurality of products of different categories, wherein the plurality of products of different categories comprise a first product of a first category (e.g., power drills or smartphones) and a first type (a first brand of power drills) and a second product of the first category (e.g., power drills or smartphones) but of a second type (e.g., a second brand of power drills); responsive to detecting the mobile device, determining an interest level of a user with the first product of the plurality of products based on information from a sensor in the physical environment; based on interest level reaching a threshold level, obtaining information about the first product, the second product, and a profile associated with the user; and based on the obtained information about the first product, the second product, and the profile, managing interactions associated with the first product. The managing interactions associated with the first product may include providing instructions to display compatibility information between a component of the first product and a third product that is indicated as owned by the user based on the profile associated with the user. The managing interactions associated with the first product may include obtaining an indication of an acceptance of an offer for the first product; and sending a message to an electronic tag of the first product that indicates the accepted offer for checkout for the user. The managing interactions associated with the first product may include providing instructions to display graphics or text directions to a location of the second product from a location of the first product. The managing interactions associated with the first product may include sending a message to an unmanned vehicle to move to a location of the first product or the location of the mobile device. The managing interactions associated with the first product may include sending a message to a customer representative mobile device, wherein the message comprises information associated with a location of the first product or the second product. The managing interactions associated with the first product comprises providing instructions to display generating a heat map associated with a purchase pattern of a plurality of products of the first type in the physical environment. All combinations in this paragraph (including the removal or addition of steps) are contemplated in a manner that is consistent with the other portions of the detailed description.

What is claimed:

1. An apparatus comprising:

a processor; and a memory coupled with the processor, the memory storing executable instructions that when executed by the processor cause the processor to effectuate operations comprising:

detecting a mobile device associated with a user entering a physical environment, wherein the physical environment comprises a plurality of products of different types, responsive to detecting that the mobile device has entered the physical environment, receiving communications between the mobile device and an electronic tag on a first product of the plurality of products, wherein the electronic tag comprises an accelerometer;

detecting, via the communications from the accelerometer in the electronic tag, that the first product has moved;

receiving social media information tailored to the user about the first product based on a profile of the user, wherein the social media information indicates that the user has an interest in the first product having a first type;

based on the communications and the social media information, obtaining information about the first product, a second product of the first type, and the profile of the user;

based on the obtained information about the first product, the second product, and the profile, providing an offer to purchase the second product to the mobile device, wherein the mobile device displays the offer to the user;

providing instructions to the mobile device to display a heat map of a purchase pattern of the plurality of products of the first type in the physical environment;

obtaining an indication of an acceptance of the offer for the second product; and sending a message to a second electronic tag of the second product that indicates the acceptance of the offer for checkout by the user.

2. The apparatus of claim 1, wherein the operations further comprise providing instructions to display graphics or text directions on the mobile device to a location of the second product from a location of the first product.

3. The apparatus of claim 1, wherein the operations further comprise sending a message to an unmanned vehicle to move to a location of the second product or the location of the mobile device.

4. The apparatus of claim 1, wherein the operations further comprise providing instructions to the mobile device to display compatibility information between a component of the second product and a third product that is indicated as owned by the user based on the profile associated with the user.

5. The apparatus of claim 1, wherein the operations further comprise sending a message to a customer representative mobile device, wherein the message comprises information associated with a location of the first product or the second product.

6. A system comprising:

a mobile device; and a server communicatively connected with the mobile device, the server comprising:

a processor; and a memory coupled with the processor, the memory storing executable instructions that when executed by the processor cause the processor to effectuate operations comprising:

detecting the mobile device associated with a user entering a physical environment, wherein the physical environment comprises a plurality of products of different types, responsive to detecting that the mobile device has entered the physical environment, receiving communications between the mobile device and an electronic tag on a first product of the plurality of products, wherein the electronic tag comprises an accelerometer;

detecting, via the communications from the accelerometer in the electronic tag that the first product has moved;

receiving social media information about the first product, wherein the social media information indicates that the user has an interest in the first product having a first type;

based on the communications and the social media information, obtaining information about the first product, a second product of the first type, and a profile associated with the user; and based on the obtained information about the first product, the second product, and the profile, providing an offer to purchase the second product to the mobile device, wherein the mobile device displays the offer to the user;

providing instructions to the mobile device to display a heat map of a purchase pattern of the plurality of products of the first type in the physical environment;

obtaining an indication of an acceptance of the offer for the second product; and sending a message to a second electronic tag of the second product that indicates the acceptance of the offer for checkout by the user.

7. The system of claim 6, wherein the operations further comprise providing instructions to display compatibility information between a component of the second product and a third product that is indicated as owned by the user based on the profile associated with the user.

8. The system of claim 6, the operations further comprising:

obtaining an indication of an acceptance of the offer for the second product; and sending a message to an electronic tag of the second product that indicates the acceptance of the offer for checkout for the user.

9. The system of claim 6, wherein the operations further comprise sending a message to an unmanned vehicle to move to a location of the first product or the location of the mobile device.

10. The system of claim 6, wherein the operations further comprise sending a message to a customer representative mobile device, wherein the message comprises information associated with a location of the first product or the second product.

11. The system of claim 6, wherein the electronic tag comprises a gyroscope.

12. The system of claim 6, wherein the operations further comprise providing instructions to display a heat map associated with a purchase pattern of the plurality of products of the first type in the physical environment.

13. A non-transitory, computer readable storage medium storing computer executable instructions that when executed by a computing device cause said computing device to effectuate operations comprising:
- detecting a mobile device associated with a user entering a physical environment, wherein the physical environment comprises a plurality of products of different types,
- responsive to detecting the mobile device has entered the physical environment, receiving communications between the mobile device and an electronic tag on a first product of the plurality of products, wherein the electronic tag comprises an accelerometer;
- detecting, via the communications from the accelerometer in the electronic tag, that the first product has moved;
- receiving social media information about the first product, wherein the social media information indicates that the user has an interest in the first product having a first type;
- based on the communications and the social media information, obtaining information about the first product, a second product of the first type, and a profile associated with the user;
- providing instructions to the mobile device to display a heat map of a purchase pattern of the plurality of products of the first type in the physical environment; and
- based on the obtained information about the first product, the second product, and the profile, providing an offer to purchase the second product to the mobile device, wherein the mobile device displays the offer to the user;
- obtaining an indication of an acceptance of the offer for the second product; and
- sending a message to a second electronic tag of the second product that indicates the acceptance of the offer for checkout by the user.

14. The non-transitory, computer readable storage medium of claim 13, the operations further comprising:
- obtaining an indication of an acceptance of the offer for the second product; and
- sending a message to an electronic tag of the second product that indicates the acceptance of the offer for checkout for the user.

15. The non-transitory, computer readable storage medium of claim 13, wherein the operations further comprise providing instructions to display graphics or text directions to a location of the second product from a location of the first product.

16. The non-transitory, computer readable storage medium of claim 13, wherein the operations further comprise sending a message to a customer representative mobile device, wherein the message comprises information associated with a location of the first product or the second product.

17. The non-transitory, computer readable storage medium of claim 13, wherein the operations further comprise providing instructions to display compatibility information between a component of the first product and a third product that is indicated as owned by the user based on the profile associated with the user.

18. The apparatus of claim 1, wherein the operations further comprise detecting an interest in the first type of products from a shopping list on the mobile device.

19. The system of claim 6, wherein the operations further comprise detecting an interest in the first type of products from a shopping list on the mobile device.

20. The non-transitory, computer readable storage medium of claim 13, wherein the operations further comprise detecting an interest in the first type of products from a shopping list on the mobile device.

* * * * *